United States Patent

James

[11] Patent Number: 5,857,477
[45] Date of Patent: Jan. 12, 1999

[54] PORTABLE CARPORT

[76] Inventor: Michael James, 12197 Sanibel Ct., Reston, Va. 22091

[21] Appl. No.: 799,692

[22] Filed: Feb. 11, 1997

Related U.S. Application Data

[60] Continuation-in-part of Ser. No. 693,401, Aug. 7, 1996, Pat. No. 5,678,796, which is a division of Ser. No. 404,491, Mar. 17, 1995, Pat. No. 5,575,300.

[51] Int. Cl.$^6$ .................................................. E04H 15/06
[52] U.S. Cl. ................................... 135/88.06; 135/88.01; 248/226.11
[58] Field of Search .......................... 248/226.11, 229.21, 248/229.22, 229.24, 231.31, 231.41, 505, 503; 135/88.01, 88.06; 224/42.26, 42.27, 42.28, 42.13, 558

[56] References Cited

U.S. PATENT DOCUMENTS

| | | | |
|---|---|---|---|
| 1,095,856 | 5/1914 | Harnishfeger | 224/42.28 |
| 1,141,185 | 6/1915 | Harnishfeger | 224/42.28 |
| 1,337,911 | 4/1920 | Hoover | 224/42.28 |
| 1,585,436 | 5/1926 | Swenson | 224/42.12 |
| 1,593,441 | 7/1926 | Cosgrove | 224/42.12 X |
| 3,036,583 | 5/1962 | Miller | 135/4 |
| 3,143,123 | 8/1964 | Boor | 135/88.07 |
| 3,186,420 | 6/1965 | Magee | 135/88.07 |
| 3,465,765 | 9/1969 | Dietz | 135/88.06 X |
| 3,952,758 | 4/1976 | Addison et al. | 135/88.07 |
| 4,605,030 | 8/1986 | Johnson | 135/117 |
| 4,655,236 | 4/1987 | Dorame et al. | 135/88 |
| 4,683,900 | 8/1987 | Carmichael | 135/88.06 |
| 4,718,711 | 1/1988 | Rabbit | 296/136 |
| 4,727,702 | 3/1988 | Baker et al. | 52/656.8 |
| 4,886,083 | 12/1989 | Gamache | 135/88 |
| 4,944,321 | 7/1990 | Moyet-Ortiz | 135/88 |
| 5,013,079 | 5/1991 | Ho | 135/88.05 X |
| 5,241,977 | 9/1993 | Flores et al. | 135/88 |
| 5,263,468 | 11/1993 | Powell | 135/87 |
| 5,575,300 | 11/1996 | James | 135/88.01 |
| 5,678,796 | 10/1997 | James | 248/226.11 |

FOREIGN PATENT DOCUMENTS

| | | | |
|---|---|---|---|
| 65748 | 2/1969 | German Dem. Rep. | 135/88.06 |
| 1018164 | 11/1991 | WIPO | 135/88.06 |

Primary Examiner—Ramon O. Ramirez
Assistant Examiner—Long Dinh Phan
Attorney, Agent, or Firm—Rabin & Champagne, P.C.

[57] ABSTRACT

A portable carport having a frame, a flexible fabric cover, and mechanisms for attaching the frame to the outsides of the wheels of an automobile. Because the frame is secured to the outsides of the wheels rather than beneath the wheels, the frame can be easily attached to the automobile after the automobile is parked. The frame is adjustable for height, width, and length, and can be adapted to cover as much of the car as desired. The wheel attachment mechanisms are also adjustable to fit any size tire. Because of the adjustable features of the invention, it can be used to protect larger vehicles such as trucks, bolts, and mobile homes.

35 Claims, 14 Drawing Sheets

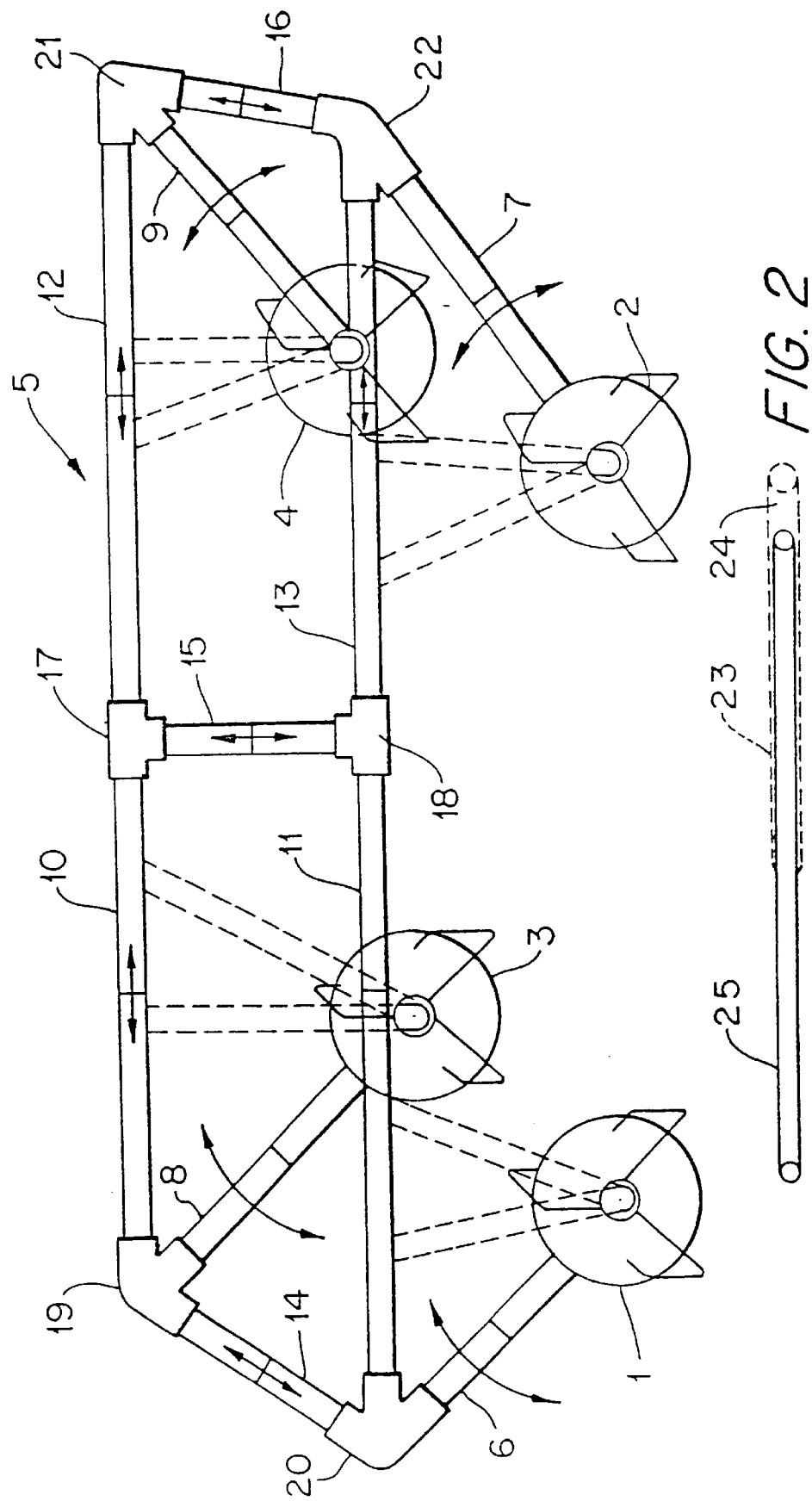

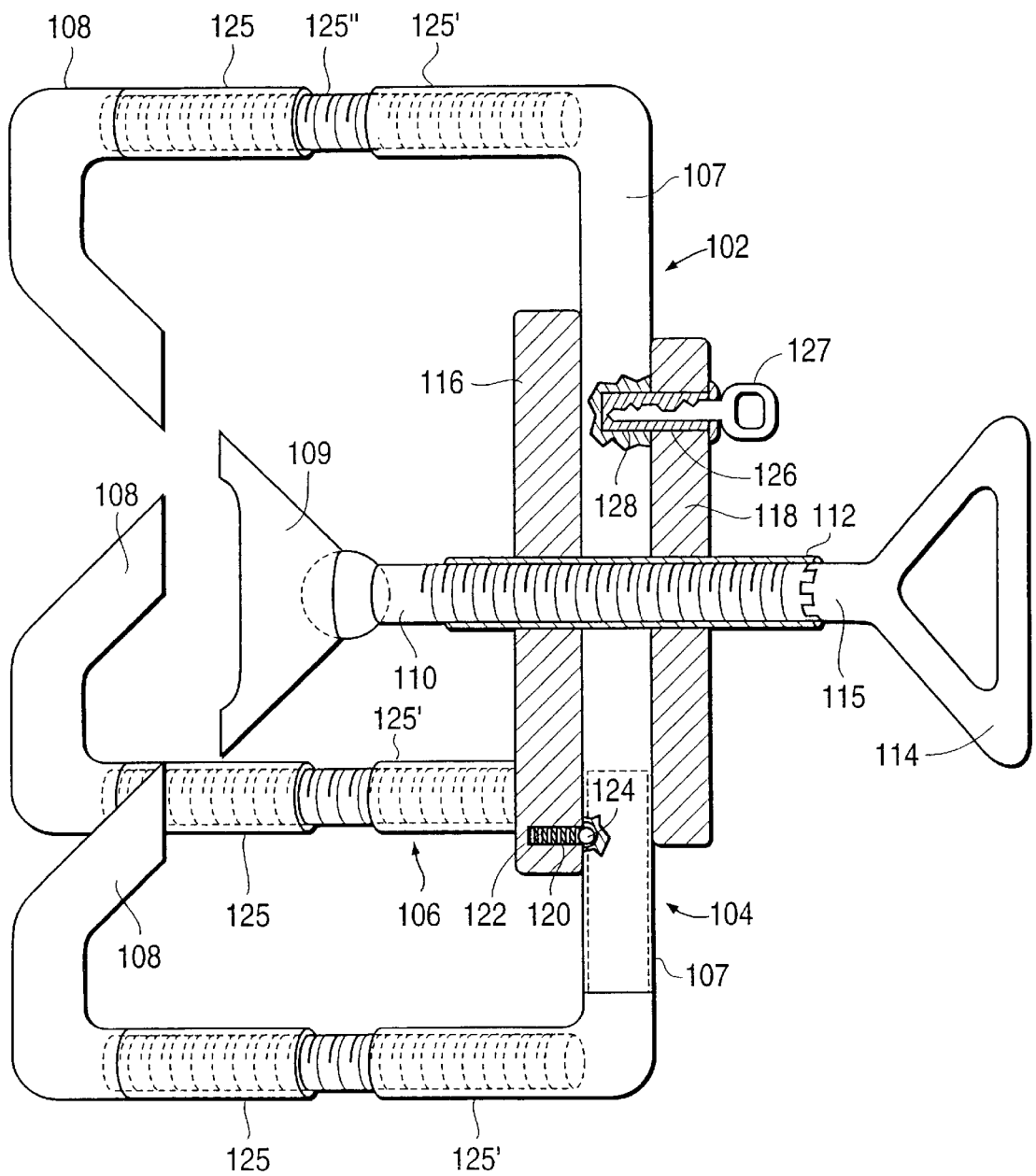

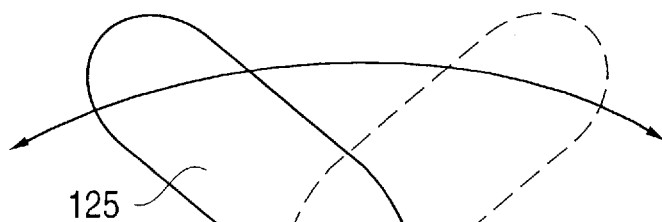
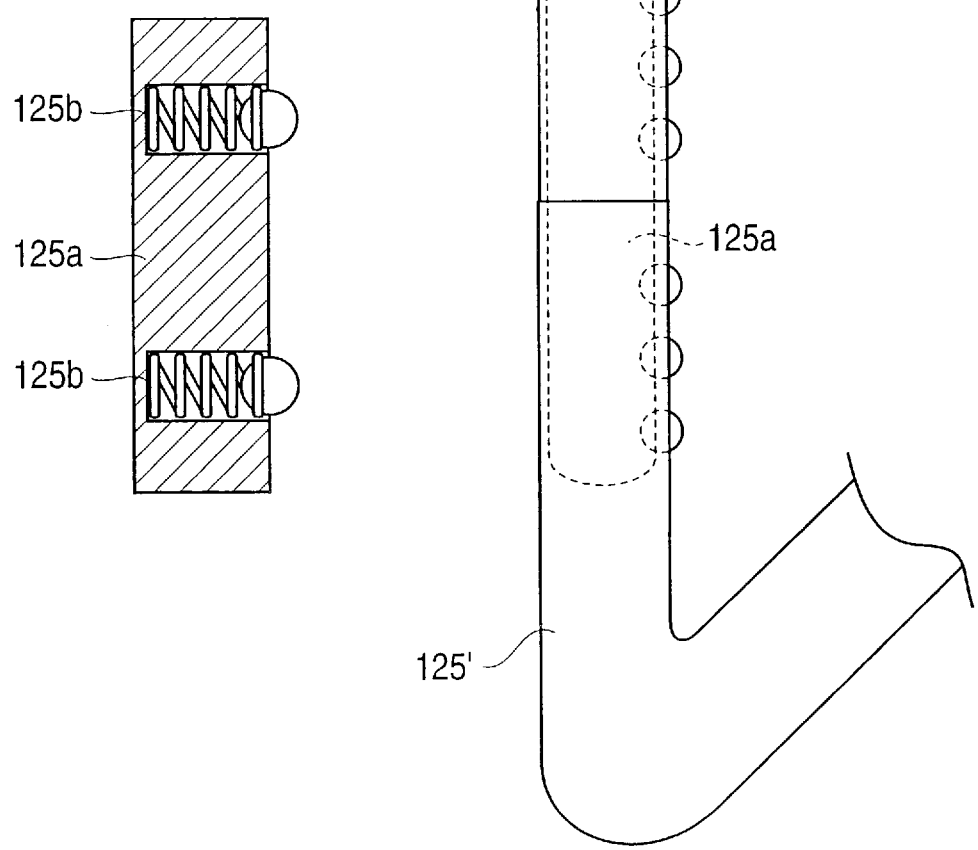

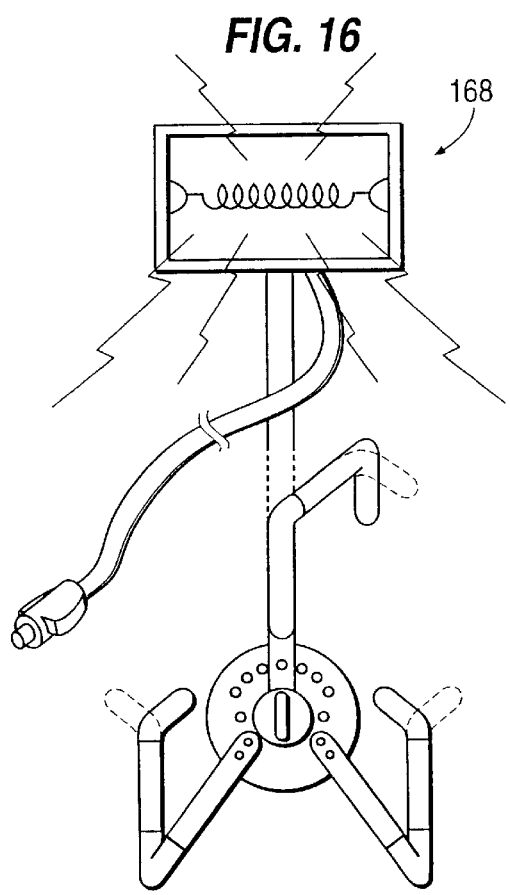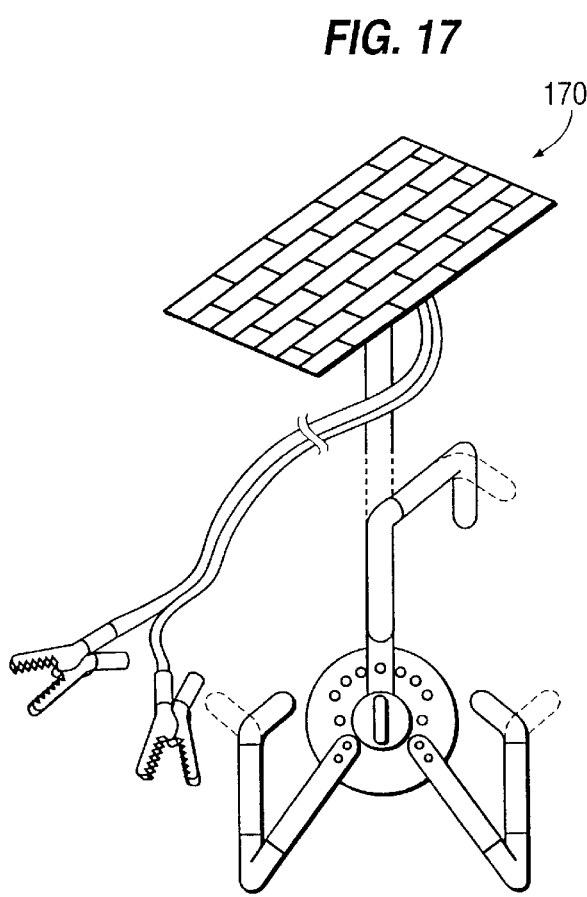

PORTABLE CARPORT

CROSS REFERENCE TO RELATED APPLICATIONS

This is a continuation-in-part of application Ser. No. 08/693,401, filed Aug. 7, 1996, now U.S. Pat. No. 5,678,796, which is a divisional of application Ser. No. 08/404,491, filed Mar. 17, 1995, now U.S. Pat. No. 5,575,300, the rights of priority of which are claimed under 35 U.S.C. § 120.

FIELD OF THE INVENTION

The present invention relates generally to a means for protecting an automobile from the elements. In particular, the present invention relates to automobile covers that are portable and easily assembled.

BACKGROUND OF THE INVENTION

One of the considerations of owning an automobile is protecting it from the elements. Many people have garages or carports, but in some urban areas, this is not practical. In most cities, street parking or alley parking is most common. Beaches often provide parking in large, open, sandy lots that offer no protection for cars from the damaging rays of the sun. Further, even if the owner of the automobile has a garage at home, he is not guaranteed a cover for his car when he reaches his destination. For owners of expensive or classic cars, whether protection will be provided is a major factor in deciding whether the automobile will be driven to a particular destination.

Portable car covers have been designed for protecting automobiles from the elements. Most automobile covers are simply tarps that are used to cover the car, and are attached to the car in some manner, such as by tying the tarp to the bumper. These tarp style covers are not adequate to truly protect the car. The tarps contact the car, and may sometimes cause damage to the finish due to abrasion. Further, if left in contact with the automobile for too long, moisture can develop between the tarp and the car body, where it is trapped and can cause rust.

Other automobile covers have been designed which do not contact the body of the car. For example, U.S. Pat. No. 5,241,977 to Flores et al. discloses a portable frame with an attached tarp-like cover. The frame consists of telescoping tubes that provide a shape for the cover. The frame is supported by parking the automobile on four base portions that are attached to the bottom of the frame. While this device provides some protection for an automobile, it is difficult to assemble. Because the automobile must be driven onto the base portions, these must be in place before the car is parked. This makes the device impractical in city parking situations, where a car must usually be parallel-parked in a small space. This car cover is also impractical for use with an automobile that is parked on a hill.

U.S. Pat. No. 4,605,030 to Johnson discloses a similar automobile cover. This cover is an improvement in that it includes cross-members on the frame, making the cover more stable, particularly in windy weather. Like the Flores et al. device, however, the automobile must be driven onto four base portions in order to anchor the frame. Similarly, U.S. Pat. No. 4,655,236 discloses a frame that includes a removable spacer resting on the roof of the automobile that provides an incline for causing rain to run off the sides of the cover. U.S. Pat. No. 4,944,321 to Moyet-Ortiz discloses a similar cover, albeit one with a more complex frame that more completely covers the automobile. All of these devices require that the automobile be driven onto base units to anchor the frame.

U.S. Pat. No. 3,036,583 to Miller discloses another automobile cover. While this device only requires two base portions to support the frame, it is still required that the automobile be driven onto the base portions to anchor the device. U.S. Pat. No. 4,886,083 also discloses an automobile cover that entirely encloses the parked car. However, the automobile must be driven onto a platform in order to anchor the frame. This renders the device less than portable.

While the reference devices all provide automobiles with differing degrees of protection from the elements, the designs are somewhat impractical. Some do not provide enough protection, only shading the automobile from directly above. The devices that provide more coverage are more complicated, making them more difficult to assemble and store. All of the devices require at least some base to be put in place before the automobile is parked, making them impractical, especially for city use, or when covering the automobile is an afterthought. What is needed is a simple, portable automobile cover that provides protection for the car, is easy to assemble and store, and which can be completely assembled and put into place after the car has already been parked.

SUMMARY OF THE INVENTION

It is therefore an object of the present invention to provide an automobile cover that can be disassembled and easily stored in a car trunk.

It is also an object of the present invention to provide an automobile cover that does not come into contact with the body of the automobile.

It is a further object of the present invention to provide an automobile cover that is easy to assemble.

It is another object of the present invention to provide an automobile cover that can be assembled in its entirety after the car has already been parked.

It is an additional object of the present invention to provide an automobile cover that adequately protects the parked car from the elements.

It is still another object of the present invention to provide an automobile cover that can be used with an automobile that is parked on a hill.

These and other objects and advantages of the present invention will be apparent to those of ordinary skill in the art upon inspection of the detailed description, drawings, and appended claims.

The present invention is a portable automobile cover that can be assembled in its entirety and attached to the automobile after the automobile has been parked. No bases anchored under the parked car are needed because the frame of the cover attaches directly to the wheels of the automobile, rather than beneath the tires. Once the attachment mechanisms are connected to the wheels, the remainder of the frame can be assembled, and a flexible cover is attached to the frame. The frame is adjustable to fit to any size wheel and any size car or truck. Because a vehicle does not have to be driven onto a base, any difficult to park vehicle such as a boat on a trailer or a mobile home can be provided with a cover by variations of the present invention.

The present invention may also be used when the vehicle is parked on a hill, as it does not rely on anchored bases and can be adjusted to tilt in order to adapt to the grade and keep the cover level.

BRIEF DESCRIPTION OF THE DRAWINGS

FIG. 1 shows an example of a first embodiment of a frame to be used as part of the present invention.

FIG. 2 shows a detail of an adjustable locking pole.

FIG. 7(A) is a side view of a further embodiment of the wheel attachment mechanism according to the present invention.

FIGS. 7(B) and 7(C) illustrate one embodiment of a component of the wheel attachment mechanism shown in FIG. 7(A).

FIGS. 14–18 illustrate the wheel attachment mechanism according to the present invention being used without a cover, and with various accessories attached.

DETAILED DESCRIPTION OF THE PRESENT INVENTION

Figure 3:
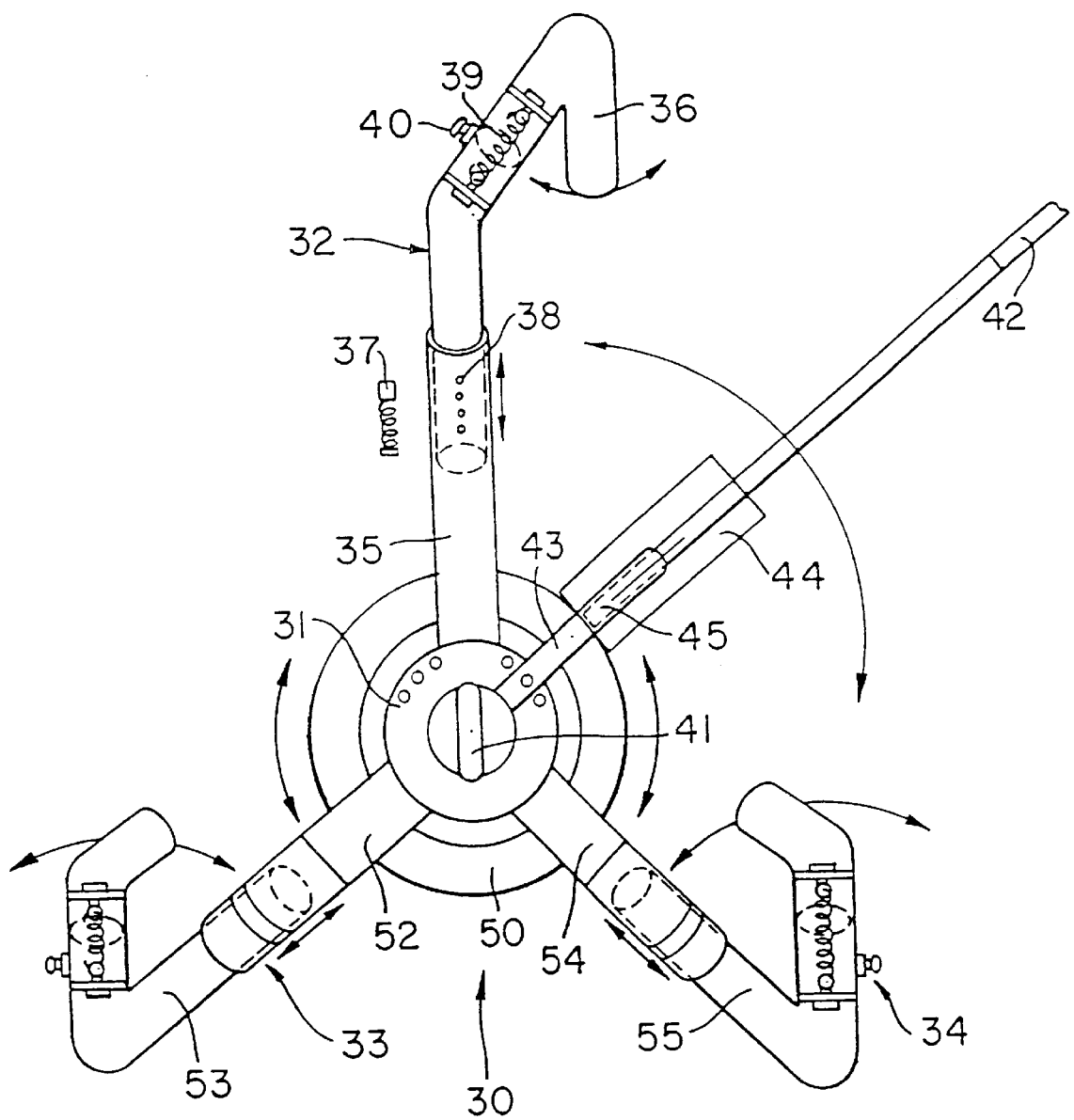
FIG. 3 shows a sample mechanism for attaching the present invention to the automobile wheels.

FIG. 1 shows an example of a first embodiment of a frame as it would look after assembly and attachment to an automobile. The wheel attachment mechanisms 1, 2, 3, and 4 are shown as they would be attached to the wheels of the automobile. The upper frame 5 is attached to the wheel attachment mechanisms 1, 2, 3, and 4 by adjustable masts 6, 7, 8, and 9 to provide a skeleton for a flexible cover (not shown). The upper frame 5 shown in FIG. 1 is an example of a frame that can be used as part of the present invention. Other frame shapes are also contemplated for use with the present invention, as will be subsequently described.

As shown, the upper frame 5 is adjustable to fit different sized cars. Adjustable masts 6, 7, 8, and 9 are attached to the wheel attachment mechanisms 1, 2, 3, and 4 as shown, and connect the upper frame 5 to the wheel attachment mechanisms 1, 2, 3, and 4. Although four adjustable masts are shown, one for each wheel attachment mechanism, more or less may be used, depending on the size and shape of the upper frame. The masts are adjustable in length to accommodate any size vehicle.

The upper frame of this embodiment includes a number of longitudinal and transverse members. The example shown in FIG. 1 has four longitudinal members 10, 11, 12, and 13 and three transverse members 14, 15, and 16. It is contemplated that the present invention may have any number of longitudinal members, transverse members, and diagonal bracing members necessary to accommodate the size and shape of the particular vehicle being protected. In the example shown in FIG. 1, the two longitudinal members on either side are attached to each other using T-connectors 17 and 18, and are connected to the transverse members through these T-connectors and through four elbow T-connectors 19, 20, 21, and 22. The masts are also connected to the upper frame at the elbow T-connectors. Other types of connectors may be used to suit the particular size, shape, and design of the upper frame. For example, if two masts are used per wheel attachment mechanism, one may be attached to the upper frame using an elbow T-connector, while the other is attached to the upper frame through a sliding sleeve on the longitudinal member. A further example of a connector will be subsequently described in detail in connection with an alternative embodiment of the upper frame.

As shown, any of the members used to construct the frame may be adjusted to fit the vehicle to which it is attached. In the example frame shown in FIG. 1, the masts can he adjusted to provide the necessary height, while the longitudinal members adjust to provide the necessary length and the transverse members adjust to provide the necessary width. In alternative embodiments, upper frame members may connect at angles to other members, or members may be hinged to adapt to a different shape.

The masts, longitudinal members, and transverse members are all typically poles that may be adjustable in length. FIG. 2 shows a detail of an adjustable pole 23 suitable for use with the present invention. The adjustable pole 23 includes a rod 25 and an outer sleeve 24. The outer sleeve 24 slides along the length of the rod 25 to provide the desired length. Once the desired length is attained, the pole 23 is temporarily fixed at that length through the use of a locking mechanism. For example, a twist locking mechanism may be used whereby a pin in the rod 25 is engaged in a groove in the sleeve 24 by twisting the rod 25 and/or sleeve 24.

Figure 4:
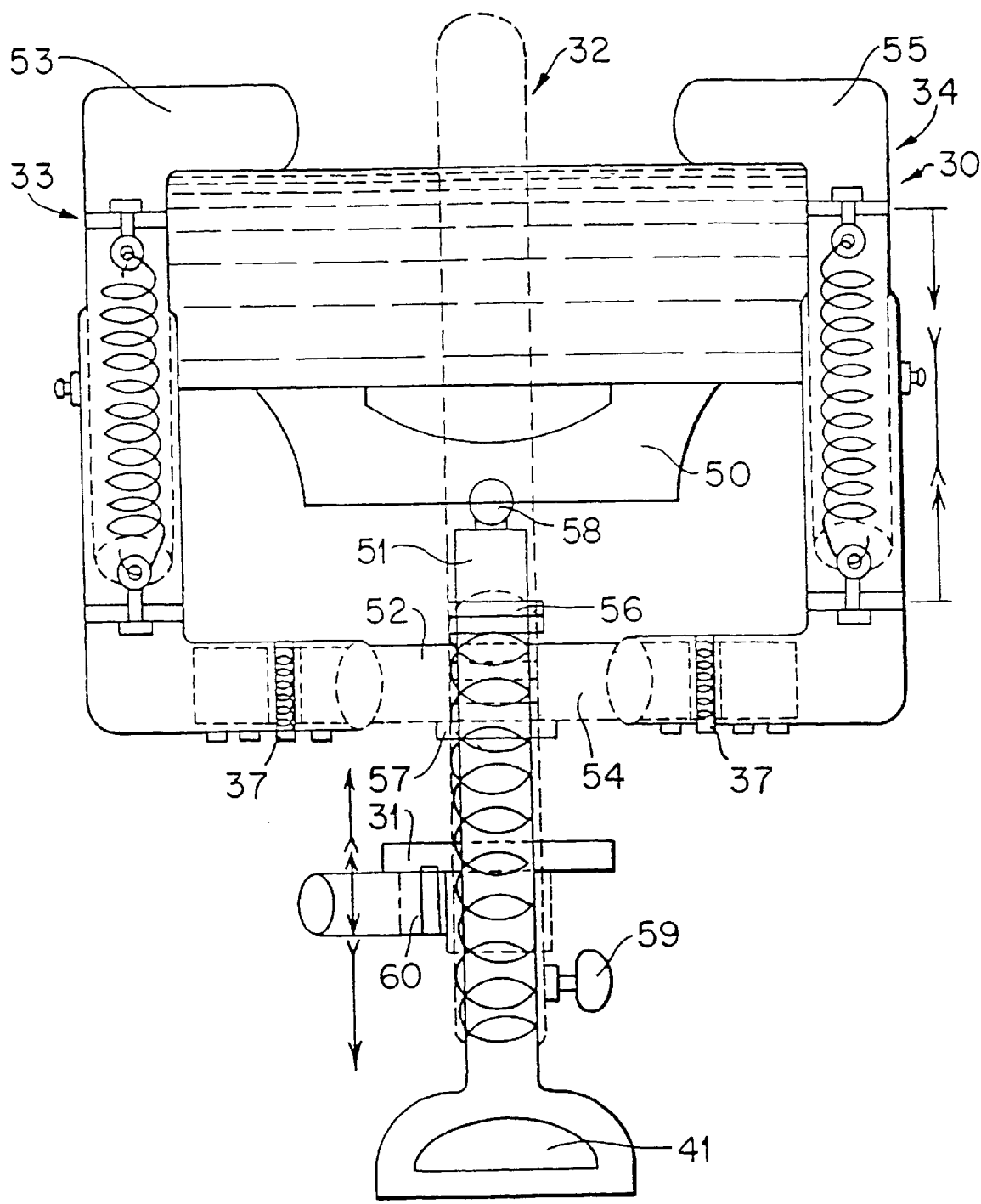
FIG. 4 shows a detail of the top view of an example wheel attachment mechanism.

FIG. 3 and FIG. 4 show different views of an example wheel attachment mechanism 30. The wheel attachment mechanism 30 clamps to the wheel to provide a stable base for the frame. Each wheel attachment mechanism 30 includes a brace 50, a shaft 51, and a number of clamp members, the example shown in FIGS. 3 and 4 having three such clamp members 32, 33, and 34. However, more or fewer than three clamp members may be used, while still providing a secure grip on the wheel of the vehicle, as will be subsequently described.

The structure of each clamp member typically includes two main pieces. The first piece is a radial arm 35, 52, 54 in the form of a substantially straight piece of tubing that radiates from the axis of the shaft 51. The other piece is a swing arm 36, 53, 55 that is formed such that is can attach around the circumferential periphery of the tire. For example, the swing arm can be a U-shaped member that can clamp around the outside of the tire. The proximal end of the swing arm attaches to the radial arm, while the distal end of the swing arm fits around the back side of the tire. The swing arm is free to rotate about the axis of the radial arm while putting the wheel attachment mechanism in place. The swing arm may slide inside the radial arm, as shown in FIG. 3, or the radial arm may slide inside the swing arm, as shown in FIG. 4. Further, the swing arm may be removed from the wheel attachment mechanism by sliding the radial arm out from its engagement with the associated radial arm. The benefits of this feature will be subsequently described.

One clamp member may be located such that it can be clamped over the top-most portion of the tire, that is, at the twelve o'clock position. For example, FIG. 3 shows clamp member 32 at this position. This clamp member includes radial arm 35 that is in a fixed position with respect to the shaft 51. The brace 50 is placed against the center of the wheel hub and the top swing arm 36 is extended with respect to the radial arm 35 until it can be swung over and hooked onto the top of the tire. The swing arm 36 is then locked into place with respect to the radial arm 35. One way in which the swing arm 36 can be locked into place is through the use of a locking pin 37 that is pushed through coaxial holes 38 in the swing arm 36 and the radial arm 35. The locking pin 37 may be of the spring-release type. A series of holes may be provided so that the wheel attachment mechanism can be used with vehicles having different size wheels. The swing arm 36 may also be adjustable to fit tires having different widths, in order to provide a secure clamping grip on the wheel. This may be accomplished by forming the swing arm in two pieces connected in a reciprocating manner by, for example, a spring-loaded device 39. Once the swing arm 36 is adjusted to the appropriate width, the pieces can be locked in place with, for example, a pin, set screw or locking key 40. Using a locking key will deter theft of the present invention while the owner is away.

Alternatively, the swing arm 36 of clamp member 32 can be removed, as indicated by the hidden lines in FIG. 4. This may be useful when installing the invention on a vehicle having a low front end or spring sag. In such a situation, and when three clamp members are used, the vehicle body may be too close to the wheel to allow the associated mast to pass by. However, by removing the clamp member in the twelve o'clock position, the upper portion of the wheel attachment mechanism 30 will be allowed to shift in an outward direction, i.e., away from the vehicle, so that the mast connected to the wheel attachment mechanism can clear the body of the vehicle. The other two clamp members 33, 34, will securely grip the wheel of the vehicle, thus holding the wheel attachment mechanism in place.

The other two clamp members 33 and 34 have a construction similar to that of the first clamp member 32. One clamp member 33 includes radial arm 52 and swing arm 53, and the other clamp member 34 includes radial arm 54 and swing arm 55. These clamp members, however, are free to pivot about the shaft 51. Thus, after the first clamp member 32 is in place on the tire, the remaining clamp members can be positioned about the wheel for the best fit. An inner lock ring 56 and an outer lock ring 57 keep the pivoting clamp members locked into position.

The shaft 51 extends from the center of the brace 50. The shaft 51 may be attached to the brace 50 by a pivot ball and snap ring assembly 58, or by some other connector that provides a degree of flexibility. The brace 50 is preferably large enough to cover any lug nuts that may be exposed, deterring theft by wheel removal.

The outer end of the shaft 51 is capped by a handle 41. The handle 41 covers the outside end of the shaft 51, while providing a convenient place for grasping the wheel attachment mechanism 30. The handle 41 can be configured to be removable from the shaft 51. This can be accomplished by forming the shaft 51 and the handle 41 of two separate components, which can be temporarily connected together in any known manner. For example, the handle can have a rod portion that can slip within a tubular portion or sleeve of the shaft 51, with the two components being connected together using, for example, a locking key 59. Thus, after the wheel attachment mechanism is attached to the wheel, the handle 41 can be removed, thus preventing removal of the wheel attachment mechanism by an unauthorized individual.

Also attached to the shaft 51 is at least one radial mast arm, which is also free to pivot about the shaft. This mast arm is shown in FIG. 3 in one position 43 and in FIG. 4 in another position 60 to illustrate the free pivoting ability of the mast arm. Referring to FIG. 3, the mast 42 attaches to mast arm 43, preferably by sliding into or around the mast arm 43, and is locked in place in some manner, preferably with a pin 45. Once the mast 42 is locked into place, the area around which the mast 42 and the mast arm 43 are connected may be enclosed by a protective cover, such as a foam bumper 44. This cover protects the finish of the vehicle from any contact that would occur between the mast 42 or mast arm 43 and the vehicle. A plate 31 is attached to the shaft 51. This plate 31 is keyed so that the mast arm 43 can be locked into place.

Figure 5:
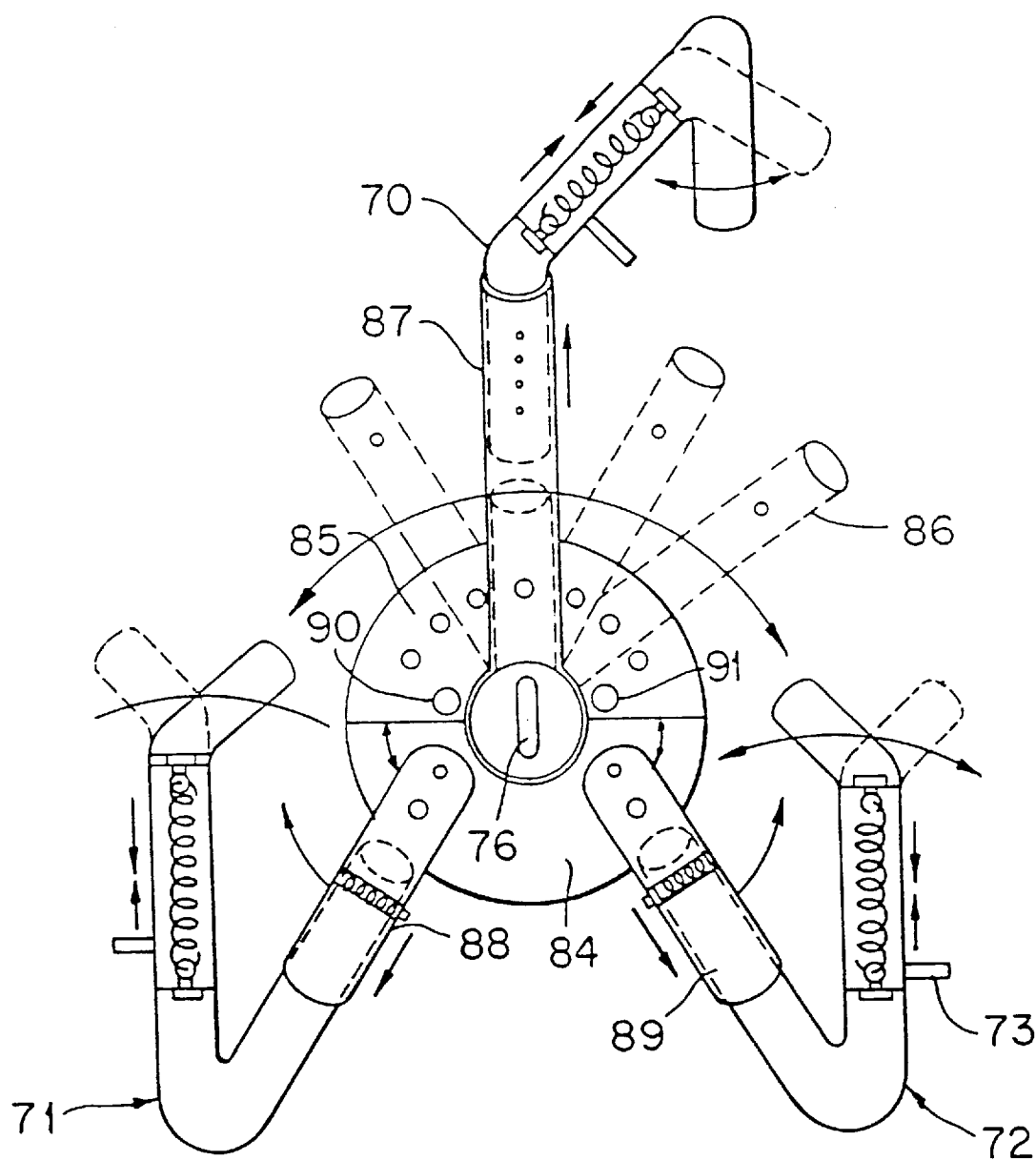
FIG. 5 shows an alternative embodiment of the wheel attachment mechanism according to the present invention.
Figure 6:
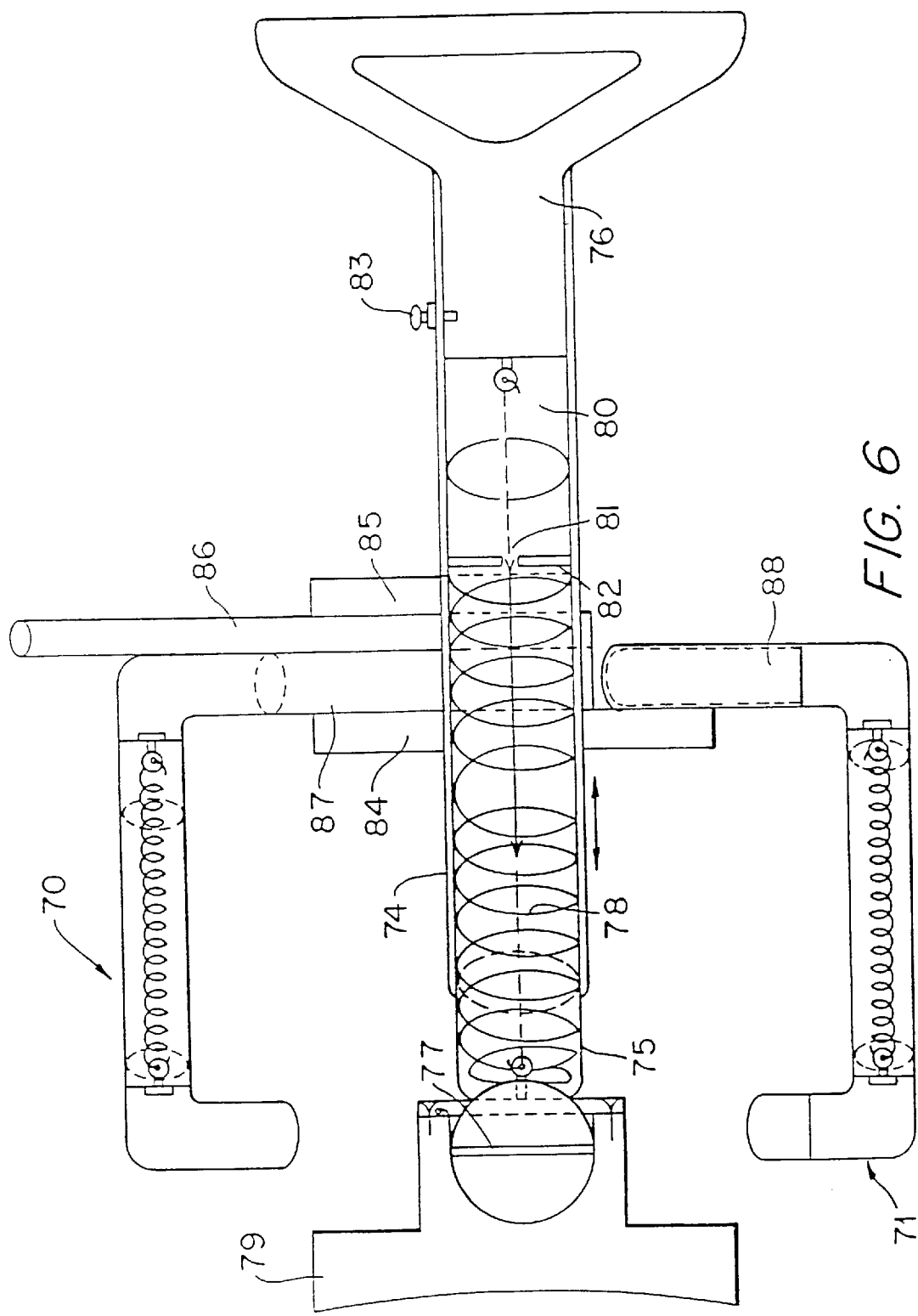
FIG. 6 shows a detail of the top view of the wheel attachment mechanism shown in FIG. 5.

FIG. 5 and FIG. 6 show different views of the preferred design for the wheel attachment mechanism. This embodiment allows the clamp members to be folded flat for easy portability. This design also provides for the mast to be adjustable over, for example, an 18-degree arc, allowing for great flexibility in shaping the completed vehicle cover. The range of adjustment of the mast also allows the vehicle cover to be kept level, even when the vehicle is parked on a grade.

As shown in FIGS. 5 and 6, this embodiment may include three clamp members, one upper clamp member 70 and two lower clamp member 71 and 72. However, similar to the previous embodiment, more or fewer than three clamp members may be used. These clamp members are adjustable for tire diameter and width as in the previously described embodiment. Push handles 73 may be attached to the clamp members to assist in adjusting the clamp member elements.

The core of the wheel attachment mechanism is a spring-loaded tube and handle assembly. This assembly includes an outer tube 74, an inner tube 75, and a handle 76, and is connected to the brace 79 by a pivot ball and snap ring assembly 77. The inner tube 75 contains a spring 78 and slides inside the outer tube 74. The spring 78 is fixed to the brace 79 at the distal (wheel) end. The handle 76 includes a tube 80 at the distal end that is closed except for a small opening 81 through which the proximal (handle) end of the spring 78 passes. The proximal end of the spring 78 is attached to the handle 76 inside the handle tube end 80. The handle tube end 80 slides inside the inner tube 75, compressing the spring 78 and providing pressure that presses the brace 79 against the wheel. The closed end 82 of the handle tube end 80 acts as a spring stop to compress the spring 78 as the handle 76 is pushed toward the wheel. When the wheel attachment mechanism is in place, the spring-loaded tube-and-handle assembly is kept in the compressed state through the use of a tube locking pin 83 or other locking mechanism. When the pin 83 is removed, compression is released and the wheel attachment mechanism can be removed.

An inner plate 84 and key plate 85 are fixed to the outer tube 74, with the upper clamp member 70 and the radial mast arm 86 being connected to the outer tube 74 between the inner plate 84 and the key plate 85. The inner plate 84 is preferably a circular shaped plate fixed to the outer tube 74 such that the outer tube 74 passes through the center of the inner plate 84 and the axis of the outer tube 74 is substantially perpendicular to the face of the inner plate 84. The key plate 85 is preferably a semi-circle that straddles the top of the outer tube 74. The radial arm 87 of the upper clamp member 70 is fixed to the proximal face of the inner plate 84 and/or to the outer tube 74, so that the radial arm 87 always points substantially in the twelve o'clock position.

The radial arms 88 and 89 of the lower clamp members 71, 72 are pivotally attached to the inner plate 84. This allows the angle of the lower clamp members 71 and 72 with respect to the upper clamp member 70 to vary. Once the lower clamp members 71 and 72 are positioned to the desired angle, they are held in place through a locking mechanism, such as a removable pin through a hole in the inner plate. When the wheel attachment mechanism is removed from the wheel, the lower clamp members 71 and 72 can be folded up against the upper clamp member 70, making the wheel attachment mechanism relatively flat for easy storage.

The radial mast arm 86 is connected to the outer tube 74 such that it can rotate about the outer tube 74. Stops 90 and 91 may be provided on the key plate 85 to prevent the mast arm 86 from rotating beyond 90 degrees in either direction with respect to the upper clamp member 70, thus allowing a full 180 degrees of rotation. The key plate 85 is keyed to provide intermediate stops for the mast arm 86, so that the mast arm 86 can be held in place when the desired angle is attained. This keying may be provided by a series of holes in the key plate aligning with a hole in the mast arm 86, which can be held in place by a removable pin. If more than one mast arm is used, a series of mast arms and key plates may be connected to the outer tube 74.

Referring to FIGS. 7(A)–7(C), an alternative embodiment of the wheel attachment mechanism is shown. This embodiment is similar to the embodiment shown in FIGS. 5 and 6, but allows for the provision of locking the wheel attachment mechanism to the wheel of the vehicle. Similarly, this wheel attachment mechanism includes clamp members which can be folded flat for easy portability.

As shown in FIG. 7(A), this embodiment may include three clamp members, one upper clamp member 102 and two lower clamp member 104 and 106. Each clamp member includes a radial arm 107, and a swing arm 108, which operate in the same manner as the previous embodiment. Moreover, similar to the previous embodiment, more or fewer than three clamp members may be used.

A tube-and-handle assembly forms the core of the wheel attachment mechanism, which may be similar to the tube-and-handle assembly of the aforementioned embodiment. This assembly is connected to the brace 109 in a removable manner, so that different braces can be used depending on the type of wheel the invention is attached to. The connection is accomplished in any known manner, for example, using a ball and snap ring assembly as previously described.

The tube-and-handle assembly includes an inner tube 110, which is located within an outer tube 112. A handle 114 is provided, which may operate in conjunction with a spring in a manner similar to the previous embodiment. Alternatively, the inner tube 110 and the outer tube 112 can be in threaded engagement with each other. In order to place the brace 109 against the hub of the wheel, the handle 114 is turned, which causes a rotation of the inner tube 110. This rotation of the inner tube 110 cause threads on an outer surface of the of the inner tube to move relative to threads on an inner surface of the outer tube 112, thus moving the brace 109 away from or toward the wheel of the vehicle. Once the brace is in position, the handle 114 may be removed, thus locking the wheel attachment mechanism in position. The handle 114 can have a shaft 115 which slides within outer tube 112, and which has an end that can be uniquely keyed or splined, and configured to engage with corresponding key slots or splines located in an end of the inner tube 110. This provides additional security against unauthorized removal of the wheel attachment mechanism.

An inner plate 116 is fixed to the outer tube 112. The inner plate 116 is preferably a circular shaped plate fixed to the outer tube 112 such that the outer tube 112 passes through the center of the inner plate 116, and the axis of the outer tube 112 is substantially perpendicular to the face of the inner plate 116.

An outer plate 118 is provided which has a center bore which allows the outer tube 112 to pass there through in a sliding manner, i.e., the outer plate is not fixed to the outer tube. The upper clamp member 102 (and if provided, a radial mast arm, not shown) is connected to the outer tube 112 between the inner plate 116 and the outer plate 118. The outer plate 118 is preferably circular-shaped, and surrounds the outer tube 112. The upper clamp member 102 is fixed to the face of the inner plate 116 and/or to the outer tube 112.

The lower clamp members 104, 106 are pivotally attached to the inner plate 116. This allows the angle of the lower clamp members 104, 106 to be varied with respect to the upper clamp member 102. When the wheel attachment mechanism is removed from the wheel, the lower clamp members 104, 106 can be folded up against the upper clamp member 102, making the wheel attachment mechanism relatively flat for easy storage.

The clamp members 102, 104, 106 are adjustable for tire diameter as in the previously described embodiment, i.e., the end of the swing arm 108 is insertable within the radial arm 107, or the radial arm is insertable within the swing arm. Once the swing arm 108 is in the desired position, it can be locked into place with respect to the radial arm 107. For example, a detent mechanism 120 can be located in the inner plate. The detent mechanism 120 may include a spring 122 located within a hole in the inner plate 116, and a ball 124 which is urged by the spring in a direction toward the respective radial arm. The corresponding clamp member has a bore which extends in a coaxial manner through both the swing arm and the radial arm. The bore receives the ball 124, thus locking the swing arm relative to the radial arm. Moreover, this locks the clamp member in a fixed relationship relative to the inner plate 116.

The swing arm 108 may also be adjustable to fit tires having different widths, in order to provide a secure clamping grip on the wheel. This may be accomplished by forming the swing arm from at least two pieces 125, 125' connected in a reciprocating manner by a spring-loaded device, as previously described. Alternatively, the two pieces 125, 125' can be threaded together, thus providing for a more stable and secure setting.

Additionally, a third piece can be provided that is positioned within the ends of the two pieces 125, 125', and which can be fixed to the two pieces to lock them in place. For example, the third piece can be a threaded shaft 125" which engages with corresponding threads located on an inner surface of the two pieces. Alternatively, and as shown in FIGS. 7(B) and 7(C), the third piece can be a cylindrical member 125*a* which has two pins 125*b* projecting therefrom. The two pieces 125, 125' are each provided with a hole in their respective side walls, which can be placed in registration with a respective pin 125*b*. When the cylindrical member 125*a* is inserted into the ends of the two pieces 125, 125', the pins 125*b* will engage with the respective holes, thus fixing the two pieces in place.

The outer plate 118 has a lock cylinder 126 that is accessible using a key 127 from a front of the outer plate 118. The lock cylinder 126 projects through the outer plate 118, and toward the inner plate 116. The upper clamp member 102 has a receiving bore 128 that receives the lock cylinder 126 when the outer plate 118 is in position, i.e., slid upon the outer tube 112. When the lock cylinder 126 is inserted into the receiving bore 128, the lock cylinder engages with the upper clamp member 102, thus locking the outer plate 118 to the upper clamp member 102. When in place, the outer plate 118 prevents access to the detent mechanism 120. As such, the wheel attachment mechanism cannot be removed, thus preventing the theft of the device.

It is also contemplated that this embodiment of the wheel attachment mechanism can be used without a frame connected thereto. For example, the wheel attachment mechanism can be attached in a temporary non-removable manner to a wheel of a vehicle, to prevent movement of the vehicle. For example, this embodiment can be used by law enforcement personal to "boot" the vehicle, so that the vehicle cannot be moved without incurring possible damage.

The material used to construct the elements of the frame is preferably a lightweight, strong metal or a heavy, sturdy plastic. Many of the frame members can be tubular to make them lighter. The material used to construct the wheel attachment mechanism is preferably a durable metal that can withstand repeated applications.

Figure 8:
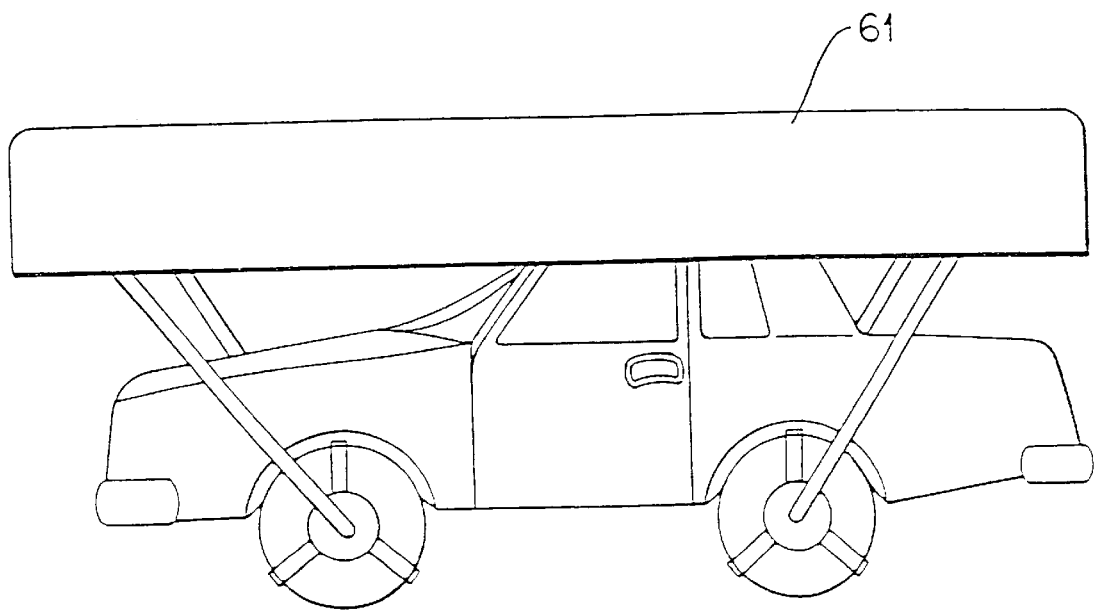
FIG. 8 shows the present invention fully assembled and attached to an automobile.

Once the frame is assembled and attached to the vehicle, a flexible fabric cover 61 can be attached to the frame, as shown in FIG. 8. The material composing the cover 61 should be strong and flexible to withstand the wear and tear that accompanies repeated uses. The cover 61 can be attached to the frame in any known manner, such as through the use of fabric strips that snap to the main cover 61. It is also contemplated that the cover 61 may have sewn-in sleeves, which will allow for the passage of various frame members, similar to the construction of known tents.

Figure 9:
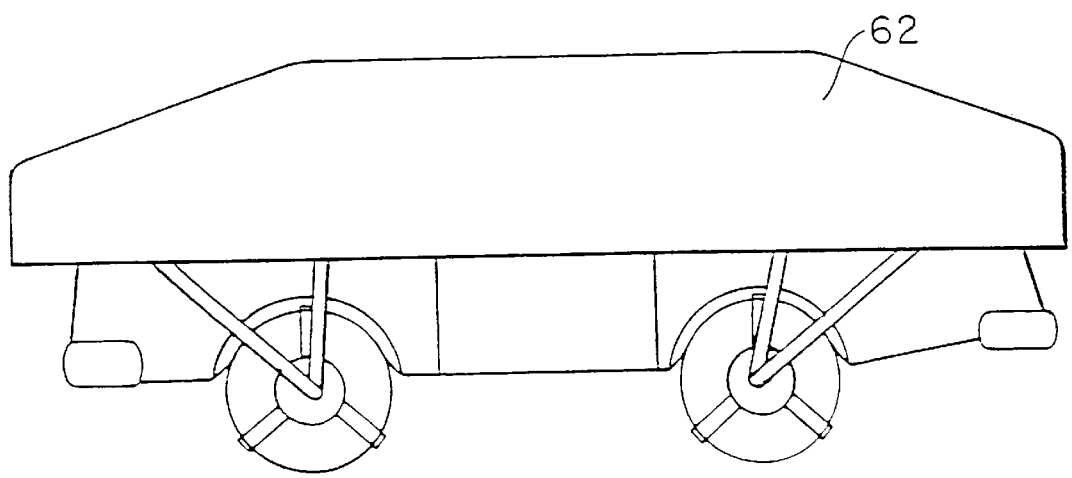
FIG. 9 shows an alternative fully assembled vehicle cover.
Figure 10:
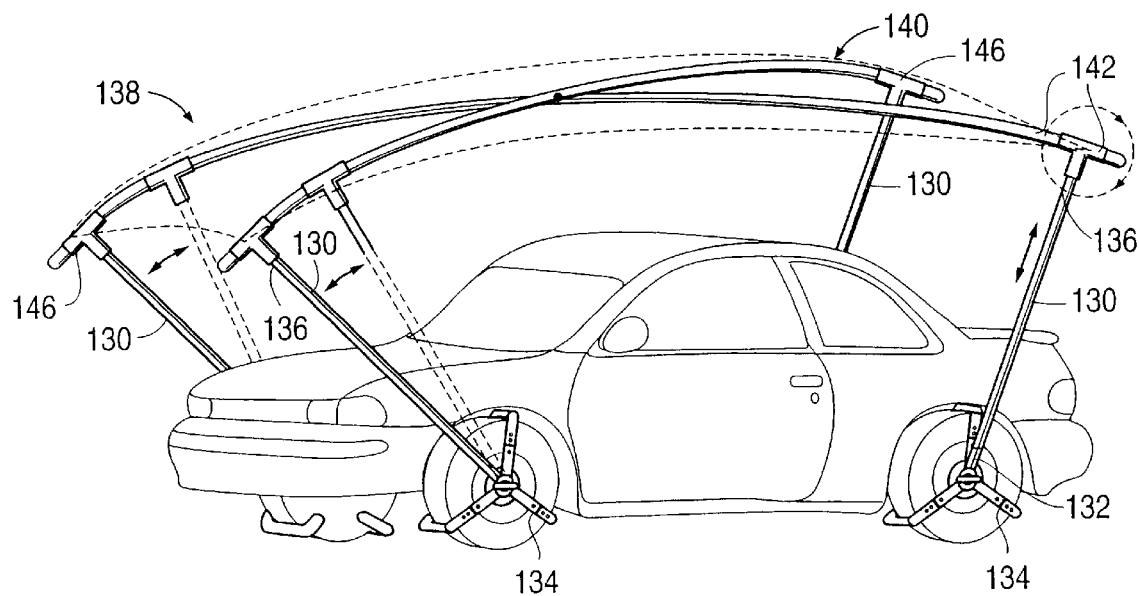
FIG. 10 is a perspective of an alternative embodiment of the present invention attached to an automobile, with the cover shown in hidden lines.
Figure 11:
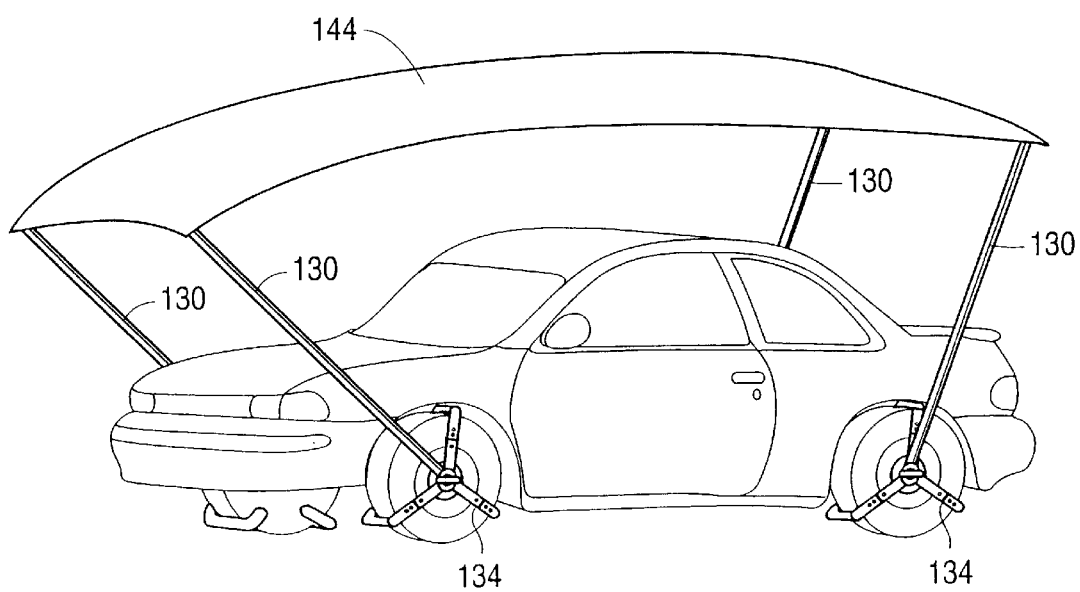
FIG. 11 illustrates the embodiment shown in FIG. 10, but with the cover indicated with solid lines.

The cover and frame shown in FIG. 8 pertain to an embodiment of the present invention having one mast per wheel attachment mechanism. FIG. 9 shows an embodiment having two masts per wheel attachment mechanism. As shown, the extra masts provide an angle to the cover 62 so that the cover 62 conforms more closely to the shape of the car, although the cover 62 does not touch the body of the car at any time.

In addition to changing the shape through the number of masts and frame members used, the size and height of the present invention can be changed merely by adjusting the lengths of the masts, longitudinal members, and transverse members, and the size of the fabric cover. For example, referring to FIG. 8, the portable carport can be brought closer to the top of the car by shortening the masts. The frame can also be lengthened to better cover the front and back of the car by lengthening the longitudinal members. The car can also be better protected by using more material for the cover 61, so that more of the material drapes over the frame and envelops the car. If desired, the material can be placed only over the top of the frame to provide a flat cover.

Referring to FIGS. 10–13, an alternative embodiment of the present invention is shown. In this embodiment, the frame includes four masts 130, each of which has a first end 132 connected to a respective wheel attachment mechanism 134 in a manner as previously described. Each mast has a second end 136 connectable to the upper frame 138. As is apparent from the drawings, in this embodiment, the upper frame 138 comprises two longitudinally extending support rods 140, 142 which cross each other to form an X (as viewed from above). One end of each support rod 140, 142 is connected to a respective mast 130 to form the frame. Once the frame is in place, a cover 144 can be attached thereto in a manner as previously described.

Figure 12:
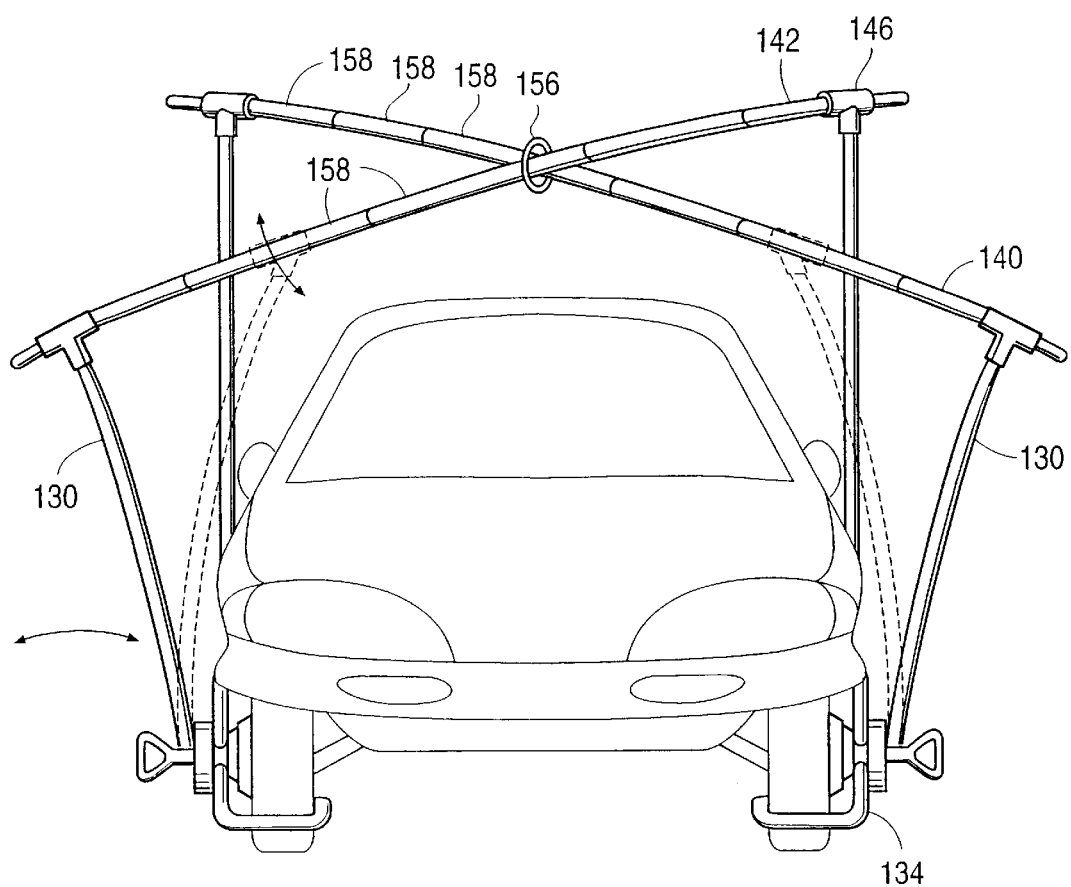
FIG. 12 is a front view of the embodiment shown in FIG. 10 without a cover.

The masts 130 are preferably constructed of a material which will allow for the masts to flex, for example, fiber-glass. As such, and as best shown in FIG. 12, when used on a vehicle having a low front end or wheel sag, the masts 130 may be caused to flex outward and away from the body of the vehicle, thus allowing this embodiment to be used with a wheel attachment mechanism having three clamp members. Alternatively, the masts may be caused to flex toward the vehicle, as indicated by the hidden lines in the figure.

Figure 13:
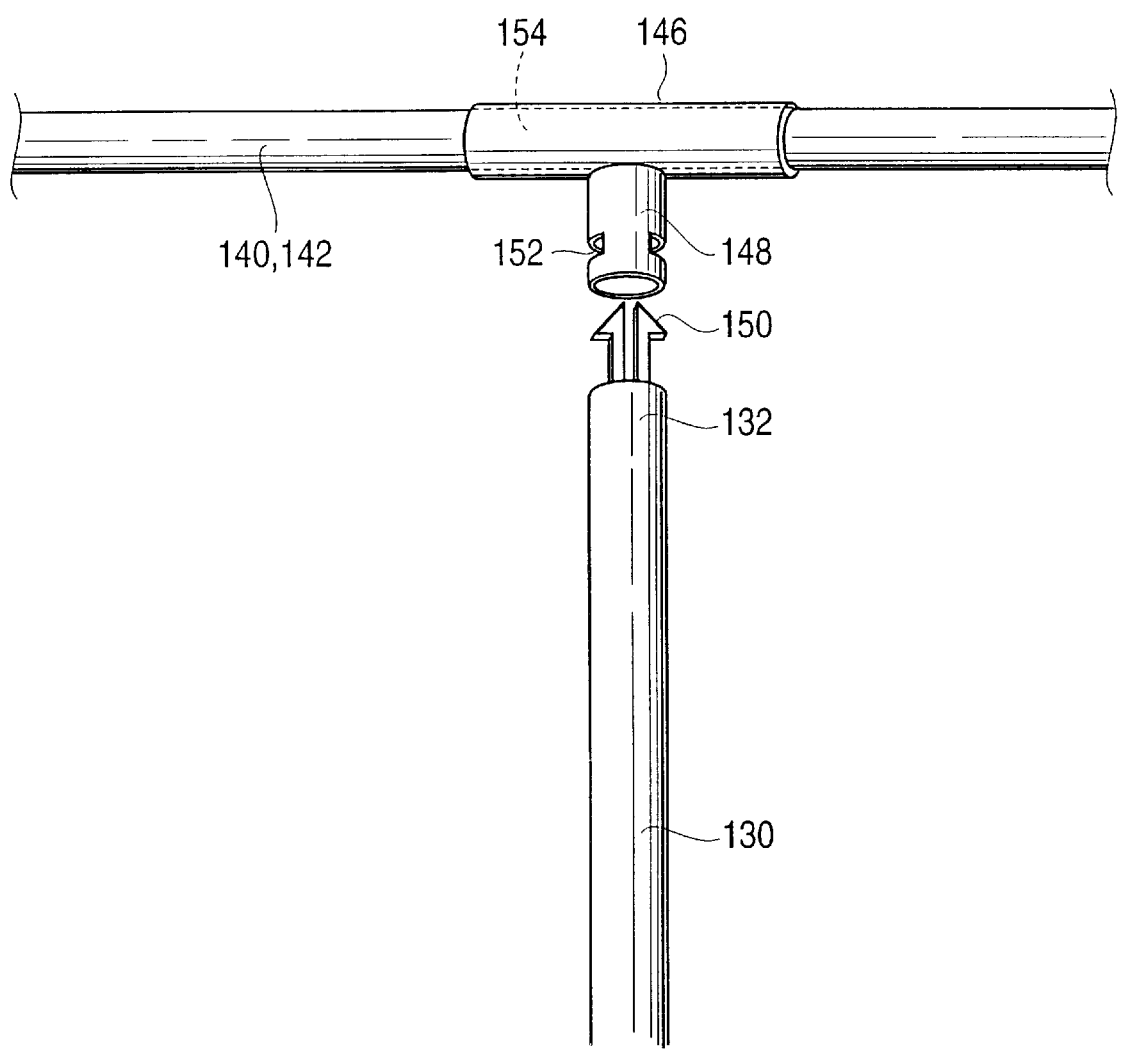
FIG. 13 shows a connector used in the assembly of the embodiment shown in FIG. 10.

As best shown in FIG. 13, the first (upper) end 132 of each mast 130 is preferably adapted to receive a T-shaped connection 146. One leg 148 of the T-shaped connection 146 is connectable to the upper end 132 of a respective mast. For example, the leg 148 can be tubular, with an inner diameter that is greater than an outer diameter of the mast 130. The end of the mast 130 can thus be slid into the leg 148 of the T-shaped connection 146. Alternatively, the mast 130 may be tubular, with the leg 148 being slid into the mast (not shown). Once installed, the T-shaped connection 146 is free to rotate about a longitudinal axis of the mast 130.

To prevent accidental removal of the T-shaped connection 146, the end of the mast 130 may be provided with tabs 150 that are engageable with corresponding grooves or recesses 152 located within the leg 148. Once the tabs 150 engage with the corresponding grooves or recesses 152, the T-shaped connection 146 is prevented from sliding in the longitudinal direction. However, the T-shaped connection 146 will still be free to rotate about the longitudinal axis of the mast 130.

The T-shaped connection 146 further includes a tubular leg 154 that extends in a direction that is essentially perpendicular to its leg 148 (i.e., in a direction that is essentially parallel to the support rods). The inner diameter of the tubular leg 154 is greater than an outer diameter of the support rods 140, 142, so that the support rods are free to slide therein, i.e., a clearance fit results. When installed, an end of each support rod 140, 142 will be positioned within a respective tubular leg 154. Due to the flexing nature of the masts 130, the free rotation of the T-shaped connection 146 about the axis of the mast it is connected to, and because the support rods 140, 142 are free to slide relative to the T-shaped connection, the resulting frame will self-adjust to the particular arrangement of the masts, and hence to the width and length of the vehicle the wheel attachment mechanisms 134 are connected to. Moreover, once in position, the flexing of the masts 130 will cause the T-shaped connection 146 to frictionally engage with the components connected thereto, thus temporarily locking the frame in a desired position. Further, by changing the flexed position of the masts 130, the shape of the installed cover 144 can be modified.

As best shown in FIG. 12, the two support rods 140, 142 are preferably connected together at their cross-point using a ring 156 which slips over the support rods. The ring 156 helps maintain the correct positional orientation of the two support rods 140, 142 relative to each other by keeping the support rods together at their crossing point.

Preferably, each support rod 140, 142 can comprise a plurality of individual longitudinal members 158 that are connectable end-to-end to form the support rod. The individual longitudinal members 158 can be connected together in any known manner. For example, one end of one longitudinal member 158 can form a sleeve that will accommodate the end of the adjoining longitudinal member, in a manner similar to the assembly of a fishing rod.

Figure 14:
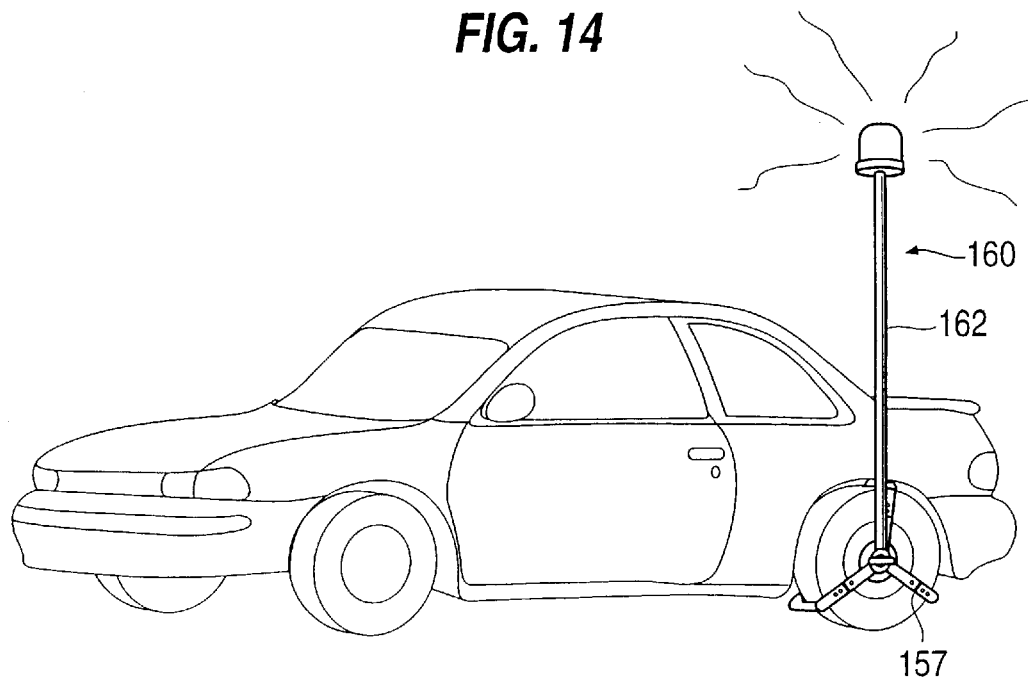
Figure 15:
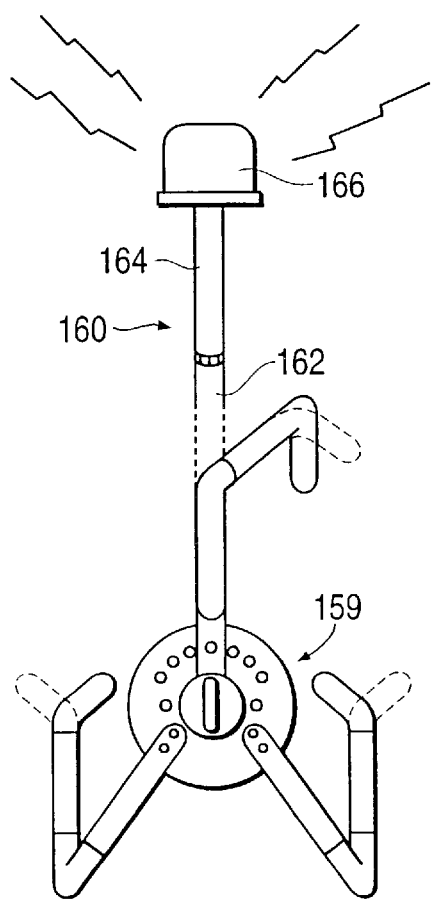
Figure 18:
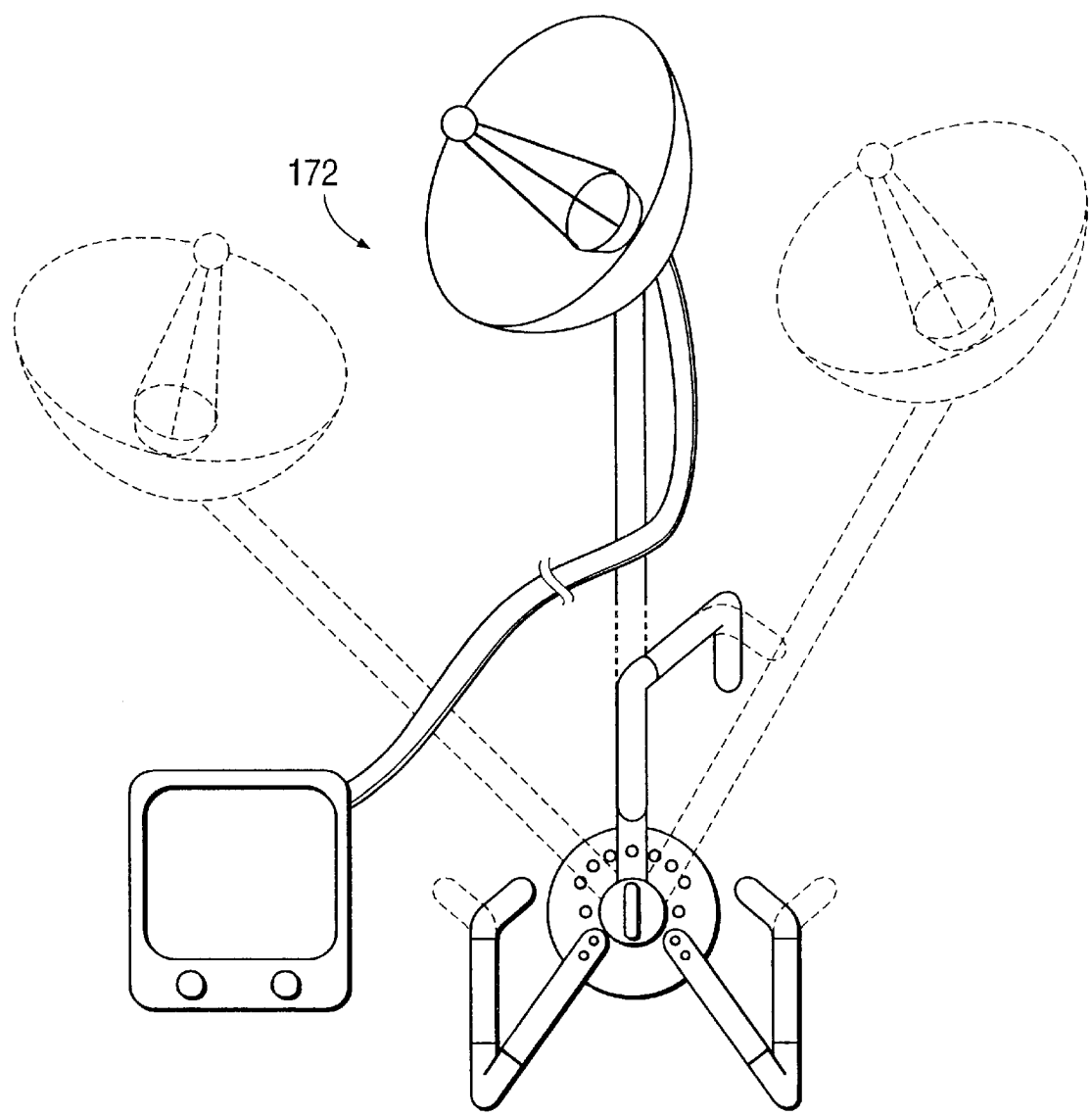

It is also contemplated that the wheel attachment mechanism may be used for other purposes, i.e., without the aforementioned frames attached. For example, and referring to FIGS. 14–18, wheel attachment mechanisms are shown having various accessories attached thereto. As illustrated in FIGS. 14 and 15, the wheel attachment mechanism 159, as described previously, has a safety beacon light 160 attached in lieu of a mast. The safety beacon light 160 includes a rod 162 connected to the wheel attachment mechanism 159 in the same manner as the aforementioned mast. The rod 162 may contain a holder 164 for batteries for powering the light of the beacon 166, or alternatively, may allow for the passage of power lines (not shown) which can be connected to the vehicle's battery for powering the light of the beacon 166. This arrangement allows the beacon light 160 to be securely mounted and at an elevation that will be readily observed. Moreover, since the beacon light 160 is connected to the vehicle via the wheel attachment mechanism 159, the exact position of the vehicle will be identified to passing motorists, which may be advantageous if the vehicle is, for example, an automobile that has broken down on a highway.

Alternatively, instead of a beacon light, the wheel attachment mechanism can have a camp-site light 168 (FIG. 16), a solar powered battery charger or engine block heater 170 (FIG. 17), or a mini-satellite dish 172 linked to a television (FIG. 18), connected thereto. It is to be understood that this list is not exhaustive, and that other accessories may instead be attached to the wheel attachment mechanism.

Preferred and alternative embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the present invention, be apparent to persons of ordinary skill in the art. For example, it is contemplated that certain features from the various embodiments may be combined in manners not expressly recited, as would be apparent to one of ordinary skill in the art.

What is claimed is:

1. A portable vehicle cover for shielding a vehicle, comprising:
    an upper frame adapted to receive a cover, said upper frame comprising at least a first longitudinal member, and a second longitudinal member crossing over said first longitudinal member to form an X-shaped frame having four respective legs;
    at least four masts, each having a first end and a second end, with each respective leg being connected to the first end of a respective mast; and
    at least four wheel attachment mechanisms, each being connected to the second end of a respective mast, and each being connectable to a respective wheel of the vehicle so that the portable vehicle cover is free of contact with the ground.

2. The portable wheel cover as defined in claim 1, wherein each of said wheel attachment mechanisms comprises a plurality of clamp members that attach to the respective wheel around a circumferential periphery of the wheel.

3. The portable vehicle cover as defined in claim 2, wherein said clamp members are adjustable to fit wheels having different diameters.

4. The portable vehicle cover as defined in claim 2, wherein said clamp members are adjustable to fit wheels having different widths.

5. The portable vehicle cover as defined in claim 1, further comprising a ring having said longitudinal members passing there through, said ring being located where said longitudinal members cross each other and connecting said longitudinal members together.

6. The portable vehicle cover as defined in claim 1, wherein each of said longitudinal members comprises a plurality of individual members connectable together.

7. The portable vehicle cover as defined in claim 1, further comprising a plurality of connectors, each having a first leg attached to a respective mast, and a second leg that is essentially perpendicular to said first leg and being attached to a respective leg of said X-shaped frame.

8. The portable vehicle cover as defined in claim 1, wherein each said connector is rotatable about an axis of the mast connected thereto.

9. The portable vehicle cover as defined in claim 8, wherein each of said second legs comprises a tube, each respective leg of said X-shaped frame extending through a respective tube in a clearance fit.

10. The portable vehicle cover as defined in claim 1, further comprising a flexible fabric cover attached to said upper frame.

11. The portable vehicle cover as defined in claim 1, wherein each of said wheel attachment mechanisms comprises:
    a shaft;
    an inner plate fixed to said shaft;
    a first clamp member fixed to said inner plate; and
    a plurality of additional clamp members pivotally connected to said inner plate;
    the first clamp member and the plurality of additional clamp members being adjustable to fit around and grasp an object when an end of said shaft is placed against the object.

12. The portable vehicle cover as defined in claim 11, wherein said shaft comprises:
    an outer tube attached to said inner plate;
    an inner tube slidingly connected within said outer tube, said inner tube having a distal end and a proximal end;
    a spring having a distal end and a proximal end and located within the inner tube;
    a brace connected to the distal end of said spring and being urged by said spring so as to press against the object; and
    a handle assembly attached to the proximal end of said spring, said handle assembly comprising a handle attached to a handle tube, said handle tube slidingly connected within said inner tube from the proximal end of said inner tube, said handle tube comprising a spring stop adapted to press against and compress said spring when said handle is pushed in the direction of the distal end of said inner tube.

13. The portable vehicle cover as defined in claim 12, wherein said shaft further comprises a locking mechanism adapted to hold said shaft in a compressed state.

14. The portable vehicle cover as defined in claim 13, wherein said locking mechanism comprises a lock pin.

15. The portable vehicle cover as defined in claim 11, further comprising:
    a key plate fixed to said shaft; and
    a radial arm pivotally connected to said shaft;
    the key plate comprising end stops to prevent said radial arm from pivoting more than 180 degrees about said shaft.

16. The portable vehicle cover as defined in claim 15, wherein said key plate is keyed to provide intermediate stops that restrict the pivotal movement of said radial arm.

17. The portable vehicle cover as defined in claim 11, wherein said first clamp member and each of the additional clamp members comprises a radial clamp arm slidingly connected to a swing arm so as to allow reciprocating movement and pivotal movement between the radial clamp arm and the swing arm.

18. The portable vehicle cover as defined in claim 17, wherein said first clamp member and each of said additional clamp members further comprise a spring connected to said radial clamp arm and said swing arm and adapted to restrict reciprocating movement between said radial clamp arm and said swing arm.

19. The portable vehicle cover as defined in claim 17, wherein said swing arm comprises a first piece and a second piece slidingly connected so as to allow pivotal movement between said first piece and said second piece and further to allow reciprocating motion between said first piece and said second piece in a direction substantially perpendicular to the reciprocating motion between said radial clamp arm and said swing arm.

20. The portable vehicle cover as defined in claim 19, wherein said first clamp member and each of said additional clamp members further comprise a spring connected to said first piece and said second piece and adapted to restrict reciprocating movement between said first piece and said second piece.

21. The portable vehicle cover as defined in claim 1, wherein each of said wheel attachment mechanisms comprises:
    a shaft having an end that is placeable against the respective wheel of the vehicle;
    an inner plate fixed to said shaft; and
    at least two clamp members connected to said inner plate; with at least one of said clamp members being pivotally connected to said inner plate, said clamp members being adjustable to grasp the respective wheel of the vehicle.

22. A portable vehicle cover for shielding a vehicle, comprising:
    an upper frame adapted to receive a cover;
    at least one mast having a first end connected to said upper frame, and a second end; and
    at least one attachment mechanism connected to the second end of said mast, and being connectable to the vehicle so that the portable vehicle cover is free of contact with the ground, said attachment mechanism including means for preventing an unauthorized removal of said attachment mechanism.

23. The portable vehicle cover as defined in claim 19, wherein said upper frame comprises a plurality of adjustable members.

24. The portable vehicle cover as defined in claim 22, wherein said upper frame comprises a plurality of longitudinal members that are adjustable so as to vary a length of the portable vehicle cover.

25. The portable vehicle cover as defined in claim 22, wherein said upper frame comprises a plurality of transverse members that are adjustable so as to vary a width of the portable vehicle cover.

26. The portable vehicle cover as defined in claim 22, wherein said mast comprises a pole that is adjustable so as to vary a height of the portable vehicle cover.

27. The portable vehicle as defined in claim 22, wherein said at least one attachment mechanism comprises at least four wheel attachment mechanisms, each being connectable to a respective wheel of the vehicle, and wherein said at least one mast comprises at least four masts, each being connected to a respective wheel attachment mechanism.

28. The portable vehicle cover as defined in claim 22, wherein said mast is flexible.

29. A portable vehicle cover for shielding a vehicle, comprising:
    an upper frame adapted to receive a cover;
    a plurality of masts, each having a first end connected to said upper frame, and a second end; and
    a plurality of wheel attachment mechanisms, each being connected to the second end of a respective mast, and each being connectable to a respective wheel of the vehicle so that the portable vehicle cover is free of contact with the ground, each of said wheel attachment mechanisms comprising:
        a shaft having an end that is placeable against the respective wheel of the vehicle;
        an inner plate fixed to said shaft; and
        at least two clamp members connected to said inner plate; with at least one of said clamp members being pivotally connected to said inner plate, said clamp members being adjustable to grasp the respective wheel of the vehicle; and
    wherein said shaft comprises:
        an outer tube attached to said inner plate, and having a threaded inner surface;
        an inner tube positioned within said outer tube, and having a threaded outer surface in engagement with said threaded inner surface;
        a brace connected to a first end of inner tube, and being movable toward and away from the wheel of the vehicle when said inner tube is rotated relative to said outer tube; and
        a removable handle assembly comprising a handle tube, and a handle attached to said handle tube, said handle tube having an end that temporarily engages with a second end of said inner tube at a location within said outer tube, whereby rotation of said handle assembly causes said inner tube to rotate relative to said outer tube.

30. The portable vehicle cover as defined in claim 29, wherein the end of said handle tube and the second end of said inner tube are keyed, so that said wheel attachment mechanism is non-removable from the respective wheel of the vehicle when said handle assembly is removed.

31. A portable vehicle cover for shielding a vehicle, comprising:
    an upper frame adapted to receive a cover;
    a plurality of masts, each having a first end connected to said upper frame, and a second end; and
    a plurality of wheel attachment mechanisms, each being connected to the second end of a respective mast, and each being connectable to a respective wheel of the vehicle so that the portable vehicle cover is free of contact with the ground, each of said wheel attachment mechanisms comprising:
        a shaft having an end that is placeable against the respective wheel of the vehicle;
        an inner plate fixed to said shaft; and
        at least two clamp members connected to said inner plate; with at least one of said clamp members being pivotally connected to said inner plate, said clamp members being adjustable to grasp the respective wheel of the vehicle, wherein each of said clamp members comprises a radial clamp arm connected to a swing arm so as to allow reciprocating movement and pivotal movement between the radial clamp arm and the swing arm.

32. The portable vehicle cover as defined in claim 31, wherein said swing arm comprises a first piece and a second piece slidingly connected so as to allow pivotal movement between said first piece and said second piece and further to allow reciprocating motion between said first piece and said second piece in a direction substantially perpendicular to the reciprocating motion between said radial clamp arm and said swing arm.

33. A portable vehicle cover for shielding a vehicle, comprising:

an upper frame adapted to receive a cover;

a plurality of masts, each having a first end connected to said upper frame, and a second end;

a plurality of wheel attachment mechanisms, each being connected to the second end of a respective mast, and each being connectable to a respective wheel of the vehicle so that the portable vehicle cover is free of contact with the ground, each of said wheel attachment mechanisms comprising:

a shaft having an end that is placeable against the respective wheel of the vehicle;

an inner plate fixed to said shaft; and at least two clamp members connected to said inner plate; with at least one of said clamp members being Pivotally connected to said inner plate, said clamp members being adjustable to grasp the respective wheel of the vehicle; and an engagement mechanism located within said inner plate and being engageable with said at least one of said clamp members to prevent the pivotal movement thereof.

34. The portable vehicle cover as defined in claim 33, further comprising an outer plate that is slidable over said shaft so as to abut against said clamp members and cover said engagement mechanism, said outer plate having a locking device that engages with one of said clamp members to fix said outer plate on said shaft and prevent access to said engagement mechanism thereby locking said wheel attachment mechanism to the respective wheel of the vehicle.

35. A portable vehicle cover for shielding a vehicle, comprising:

an upper frame adapted to receive a cover;

a plurality of masts, each having a first end connected to said upper frame, and a second end; and a plurality of wheel attachment mechanisms, each being connected to the second end of a respective mast, and each being connectable to a respective wheel of the vehicle so that the portable vehicle cover is free of contact with the ground, each of said wheel attachment mechanisms comprising:

a shaft having an end that is placeable against the respective wheel of the vehicle;

an inner plate fixed to said shaft; and at least three clamp members connected to said inner plate; with at least one of said clamp members being pivotally connected to said inner plate, said clamp members being adjustable to grasp the respective wheel of the vehicle, with one of said clamp members being removably connected to said inner plate.

* * * * *